(12) United States Patent
Li (10) Patent No.: US 9,977,709 B2
(45) Date of Patent: May 22, 2018

(54) METHOD AND SYSTEM FOR REPAIRING FAULT OF TERMINAL

(71) Applicant: SHENZHEN TCL NEW TECHNOLOGY CO., LTD, Shenzhen, Guangdong (CN)

(72) Inventor: Yu Li, Guangdong (CN)

(73) Assignee: SHENZHEN TCL NEW TECHNOLOGY CO., LTD, Shenzhen (CN)

( * ) Notice: Subject to any disclaimer, the term of this patent is extended or adjusted under 35 U.S.C. 154(b) by 100 days.

(21) Appl. No.: 15/102,273

(22) PCT Filed: Dec. 15, 2014

(86) PCT No.: PCT/CN2014/093801
§ 371 (c)(1),
(2) Date: Jun. 6, 2016

(87) PCT Pub. No.: WO2016/045203
PCT Pub. Date: Mar. 31, 2016

(65) Prior Publication Data
US 2017/0091019 A1      Mar. 30, 2017

(30) Foreign Application Priority Data
Sep. 22, 2014  (CN) .......................... 2014 1 0485667

(51) Int. Cl.
*G06F 11/00*      (2006.01)
*G06F 11/07*      (2006.01)

(52) U.S. Cl.
CPC ...... *G06F 11/0793* (2013.01); *G06F 11/0709* (2013.01); *G06F 11/079* (2013.01);
(Continued)

(58) Field of Classification Search
CPC ............. G06F 11/0793; G06F 11/0709; G06F 11/0751; G06F 11/0778; G06F 11/0784; G06F 11/079
See application file for complete search history.

(56) References Cited

U.S. PATENT DOCUMENTS

2010/0199132 A1*  8/2010  Compton ............ G06F 11/0709
                                                             714/57
2013/0007527 A1*  1/2013  Petukhov ............ G06F 11/0793
                                                             714/37
(Continued)

FOREIGN PATENT DOCUMENTS

| CN | 103389916 A | 11/2013 |
|---|---|---|
| CN | 103530199 A | 1/2014 |
| CN | 103995715 A | 8/2014 |

OTHER PUBLICATIONS

International Search Report of PCT Patent Application No. PCT/CN2014/093801 dated Jun. 19, 2015.

*Primary Examiner* — Joseph D Manoskey (57) ABSTRACT

Disclosed is a method for repairing a fault of a terminal which includes: acquiring, by a terminal, an error log according to fault repairing instructions, and extracting identification information of a corresponding application from the error log; when the application is a local application, according to the identification information of the local application and a preset top level domain name corresponding to an after sales server of the local application, determining an IP address of the after sales server; sending the error log to the corresponding after sales server; determining, by the after sales server, a solution according to the error log, and feeding back the solution to the terminal; and performing, by the terminal, operation of repairing the fault of the terminal according to the solution. Also disclosed is a system for repairing a fault of a terminal.

20 Claims, 3 Drawing Sheets

(52) U.S. Cl.
CPC ...... *G06F 11/0751* (2013.01); *G06F 11/0778* (2013.01); *G06F 11/0784* (2013.01)

(56) References Cited

U.S. PATENT DOCUMENTS

| | | | | |
|---|---|---|---|---|
| 2013/0166962 A1* | 6/2013 | Branson | ............. | G06F 11/3065 714/47.3 |
| 2014/0245085 A1* | 8/2014 | Halverson | ........... | G06F 11/0766 714/57 |
| 2014/0325254 A1* | 10/2014 | Mani | ................... | G06F 11/0793 714/2 |
| 2015/0193296 A1* | 7/2015 | Chen | ..................... | G06F 11/079 714/15 |

* cited by examiner

METHOD AND SYSTEM FOR REPAIRING FAULT OF TERMINAL

TECHNICAL FIELD

The present disclosure relates to the field of communication technologies, and in particular, to a method and system for repairing a fault of a terminal.

BACKGROUND

Genuine products are provided with warranty service after sales, such as service after sales for repairing a fault. In the prior art, the process of after sales service for electronics products generally includes: reviewing first a faulty product after sales by an after sales servant, acquiring log information of the faulty product after sales, and analyzing and locating a fault according to the log information and then repairing the fault. With the limitation of limited skill levels of the after sales servant and the incomplete information of the fault described by the user, fault locating cannot be implemented by using acquired log information usually, even worse, the log information cannot be acquired. That is, it is relatively difficult to acquire the log information configured to locating the fault, repairing of the fault cannot be implemented, and eventually the faulty product is returned to the factory for repairing (returning board). It costs time and economic cost for returning to the factory and affects reputation of after sales service of a product of a company.

SUMMARY

A major objective of the present disclosure is to solve the technical issue where it is relatively difficult to acquire log information configured to locating a fault, and repairing of the fault cannot be implemented.

To implement the foregoing objective, the present disclosure provides a method for repairing a fault of a terminal, including:

acquiring, by the terminal, an error log of the terminal according to fault repairing instructions, and extracting identification information of a corresponding application from the error log;

when the application is a local application, according to the identification information of the local application and a preset top level domain name corresponding to an after sales server of the local application, determining an IP address of the after sales server corresponding to the local application;

sending the error log to the corresponding after sales server according to a preset receiving port and the IP address of the after sales server, and determining, by the after sales server, a solution according to the error log, and feeding back the solution to the terminal; and performing, by the terminal, operation of repairing the fault of the terminal according to the solution.

Preferably, in the method for repairing a fault of a terminal, when the identification information of the local application is a process name of the local application, the step of the according to the identification information of the local application and a preset top level domain name corresponding to an after sales server of the local application, determining an IP address of the after sales server corresponding to the local application specifically includes:

combining the process name of the local application and the preset top level domain name corresponding to the after sales server of the local application to form a second level domain name, and determining the IP address of the after sales server corresponding to the local application according to the second level domain name.

Preferably, the acquiring, by the terminal, an error log of the terminal according to fault repairing instructions, and extracting identification information of a corresponding application from the error log specifically includes:

creating a log file according to the fault repairing instructions, and redirecting log information generated by the terminal to the log file; and analyzing the log information in the log file to find out the error log, and acquiring the process name of the corresponding application from the error log.

Preferably, after extracting identification information of the corresponding application from the error log, the method further includes:

sending, by the terminal, when the application is a third party application, according to a preset receiving port and an IP address of an after sales server of the third party application, the error log to the after sales server.

Preferably, the determining, by the after sales server, a solution according to the error log, and feeding back the solution to the terminal specifically includes:

determining, by the after sales server, whether the solution corresponding to the error log is saved in a database of the after sales server;

if yes, feeding back the solution to the corresponding terminal;

if not, feeding back prompt information to the corresponding terminal to inform a terminal user that the solution cannot be fed back currently; and detecting whether the solution corresponding to the error log is generated, if yes, timely feeding back the solution to the corresponding terminal, and saving the solution and the corresponding error log to the database of the after sales server.

Preferably, the step of the determining, by the after sales server, a solution according to the error log, and feeding back the solution to the terminal specifically includes:

acquiring, by the after sales server, a sending port and an IP address of the terminal according to the received error log, so that the after sales server feeds back the corresponding solution to the terminal according to the sending port and the IP address of the terminal.

To implement the foregoing objective, the present disclosure further provides a system for repairing a fault of a terminal, including:

at least an after sales server, configured to receive an error log fed back by a terminal and feed back a corresponding solution to the terminal according to the error log; and the terminal, configured to acquire the error log of the terminal according to fault repairing instructions and extract identification information of a corresponding application from the error log; wherein when the application is a local application, an IP address of the after sales server corresponding to the local application is determined according to the identification information of the local application and a preset top level domain name corresponding to the after sales server of the local application; wherein the error log is sent to the corresponding after sales server according to a preset receiving port and the IP address of the after sales server; and wherein operation of repairing the fault of the terminal is performed according to the solution fed back by the after sales server.

Preferably, when the identification information of the local application is a process name of the local application, the terminal is further configured to combine the process name of the local application and the preset top level domain name corresponding to the after sales server of the local application to form a second level domain name, and configured to determine the IP address of the after sales server corresponding to the local application according to the second level domain name.

Preferably, the terminal is further configured to create a log file according to the fault repairing instructions and redirect log information generated by the terminal to the log file, and configure to analyze the log information in the log file to find out the error log, and configure to acquire the process name of the corresponding application from the error log.

Preferably, the terminal is further configured to send, when the application is a third party application, according to a preset receiving port and an IP address of an after sales server of the third party application, the error log to the after sales server.

According a method and system for repairing a fault of a terminal provided by the present disclosure, the terminal acquires an error log of the terminal according to fault repairing instructions, and extracts identification information of a corresponding application from the error log. When the application is a local application, an IP address of an after sales server corresponding to the local application is determined according to the identification information of the local application and a preset top level domain name corresponding to the after sales server of the local application. The error log is sent to the corresponding after sales server according to a preset receiving port and the IP address of the after sales server. The after sales server determines a solution according to the error log, and feeds back the solution to the terminal. The terminal performs operation of repairing the fault of the terminal according to the solution. In this way, the error log of the terminal can be acquired quickly and accurately. Repairing the fault of the terminal can be rapidly achieved. The occurrence of returning the faulty terminal to the factory for repairing is suppressed completely and effectively. The speed at which the fault of the terminal is repaired is accelerated. Economic cost and time for repairing the fault of the terminal is reduced effectively. Meanwhile, reputation of quality of after sales service of a company is maintained effectively.

To make the objectives, features, and advantages of the present disclosure more comprehensible, the following describes the embodiments of the present disclosure with reference to the accompanying drawings.

DESCRIPTION OF EMBODIMENTS

It should be understood that the specific embodiments described herein are merely used for describing the present disclosure, but are not intended to limit the present disclosure.

Figure 1:
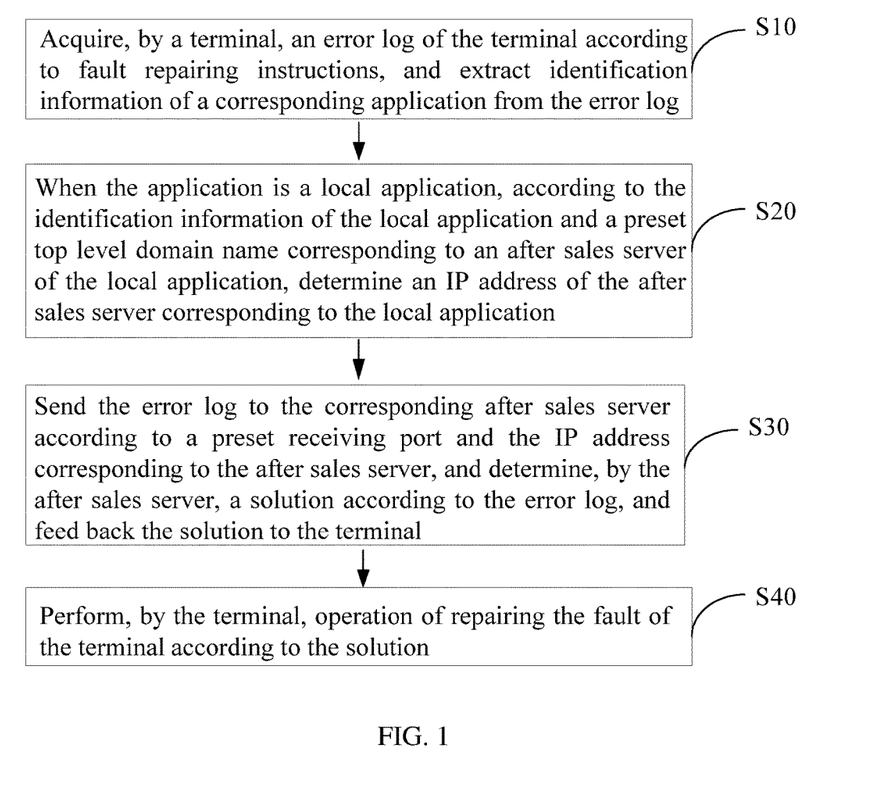
FIG. 1 is a schematic flowchart of a method for repairing a fault of a terminal according to an embodiment of the present disclosure.

Referring to FIG. 1, the present disclosure provides a method for repairing a fault of a terminal. FIG. 1 is a schematic flowchart of a method for repairing a fault of a terminal according to an embodiment of the present disclosure. In the embodiment, the method for repairing a fault of a terminal includes:

Step S10: Acquire, by a terminal, an error log of the terminal according to fault repairing instructions, and extract identification information of a corresponding application from the error log.

The processing process of Step S10 specifically includes: creating a log file according to the fault repairing instructions and redirecting log information generated by the terminal to the log file, and analyzing the log information in the log file to find out the error log, and acquiring a process name of the corresponding application from the error log. The operation of redirecting is operation of redirecting in real time and is implemented by using LOGCAT instructions. After a setting time of the error log is generated, the operation of redirecting is stopped. After the operation of redirecting is stopped, the log information is analyzed continuously until the process name of the corresponding application is acquired. That is, after the log file is created, the log information generated by the terminal is redirected to the foregoing log file in real time, and the log information in the log file is analyzed in real time. When the error log is found out after the analyzing, a timer is started, and after a setting time, the operation of redirecting is stopped. As it costs some time to analyze to find out the error log, while analyzing to find out the error log, not all the error logs are completely redirected to the log file. In the embodiment, after a setting time of the error log is generated, the operation of redirecting is stopped, that is, all the error logs are ensured to be redirected to the foregoing log file, and the complete error logs are ensured to be found out. The foregoing setting time may be setting according to an actual situation, such as 10 seconds.

In the step, the specific process of analyzing the log information to find out the error log and acquiring the process name of the corresponding application is as follows: The log information is read line by line. When one or more keywords, such as err, error, fail and exception, occur in one line in the log information, the log including this line is indicated to be an error log, and then whether a character string between the first left-paren character "(" and the first slash "/" in this line includes a character "." is determined wherein if so, a character string before the character "." in the character string between the first left-paren character "(" and the first slash "/" is extracted. The extracted character string is the process name of the application corresponding to the error log.

Step S20: When the application is a local application, according to the identification information of the local application and a preset top level domain name corresponding to an after sales server of the local application, determine an IP address of the after sales server corresponding to the local application.

The application in the embodiment includes the local application and a third party application. The after sales server binds a second level domain name and a receiving port to each local application of the terminal. When the application is the local application, the identification information of the local application is the process name of the local application or another identifier configured to distinguish between applications. The identification information of the local application in the embodiment is the process name of the local application. The process name of the corresponding local application and the preset top level domain name of the terminal are combined to form the IP address (i.e. a second level domain name) of the after sales server. The after sales server binds a corresponding second level domain name to each local application in many ways. For example, in a process in which the IIS (Internet Information Services, basic Internet services local to the window system) application is running, the corresponding second level domain name is bound to each local application. In an alternative way, an automatic match is provided among each local application for choosing (in the automatic match, the process name of the local application is extracted, and the process name and the preset top level domain name of the terminal are combined to form the second level domain name), which implements the binding of the second level domain name.

In the embodiment, because the identification information of the local application is the process name of the local application, the specific process of determining, according to the identification information of the local application and the preset top level domain name corresponding to the after sales server of the local application, the IP address of the after sales server corresponding to the local application is as follows: the process name of the local application and the preset top level domain name corresponding to the after sales server of the local application are combined to form the second level domain name, and the IP address of the after sales server corresponding to the local application is determined according to the second level domain name.

In the embodiment, a list of process names of the local application is saved in the terminal. After the terminal finding out the error log and acquiring the process name of the corresponding application, whether the acquired process name exists in the list of process names is determined by the comparison between the process name and the saved list of process names. If the acquired process name exists in the list of process names, the application corresponding to the acquired process name is indicated to be the local application and otherwise the third party application.

In addition, the way in which the terminal determines whether the application corresponding to the acquired process name is the local application may also be using code generation. For example, by using the method of getInstalledApplications of PackageManager in android system, all the attributes of ApplicationInfo and ApplicationInfo.FLAG_SYSTE-M are acquired, and an "and" (&) operation is performed on the attributes of ApplicationInfo and ApplicationInfo.FLAG_SYSTEM where the application corresponding to the acquired process name is indicated to be the local application when the operation produces a non-zero result, and otherwise the third party application.

Step S30: Send the error log to the corresponding after sales server according to a preset receiving port and the IP address of the after sales server, and determine, by the after sales server, a solution according to the error log, and feed back the solution to the terminal.

Figure 2:
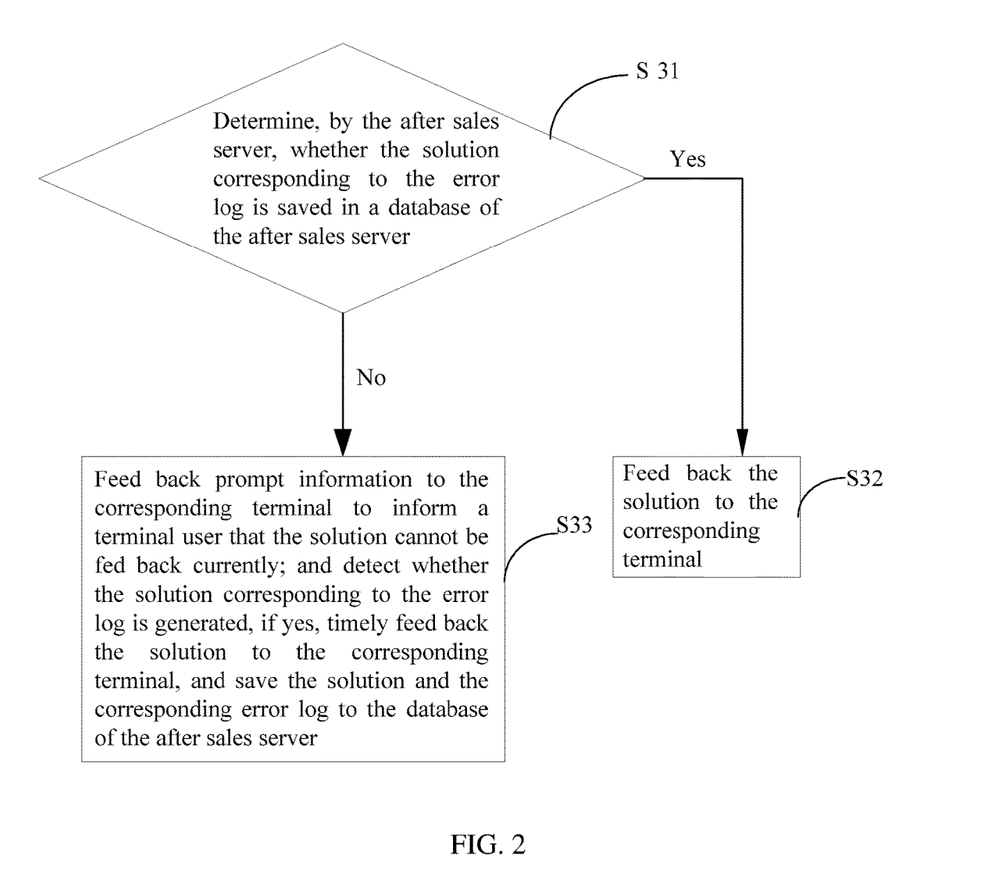
FIG. 2 is a schematic flowchart of the step of the after sales server determining a solution according to an error log in a method for repairing a fault of a terminal according to an embodiment of the present disclosure.

In the embodiment, the step of determining, by the after sales server, the solution according to the error log, and feeding back the solution to the terminal specifically includes: acquiring, by the after sales server, a sending port and an IP address of the terminal from the received error log, so that the after sales server establishes a connection to the terminal by using the sending port and the IP address of the terminal in order that the after sales server feeds back the corresponding solution to the terminal. Referring to FIG. 2, FIG. 2 is a schematic flowchart of the step of the after sales server determining a solution according to an error log in a method for repairing a fault of a terminal according to an embodiment of the present disclosure. The step of determining, by the after sales server, the solution according to the error log, and feeding back the solution to the terminal specifically includes:

Step S31: Determine, by the after sales server, whether the solution corresponding to the error log is saved in a database of the after sales server: if yes, proceed to step S32; if not, proceed to step S33.

In the embodiment, the solution includes a new application needed to repair the fault of the terminal and information about the procedure of repairing the fault. The information about the procedure of repairing the fault describes how the terminal operates, such as how the terminal uninstalls the application corresponding to the error log and re-installs the corresponding new application.

Step S32: Feed back the solution to the corresponding terminal.

Step S33: Feed back prompt information to the corresponding terminal to inform a terminal user that the solution cannot be fed back currently; and detect whether the solution corresponding to the error log is generated, if yes, timely feed back the solution to the corresponding terminal, and save the solution and the corresponding error log to the database of the after sales server. In addition, in an alternative way, while the terminal user is informed that the solution cannot be fed back currently, the corresponding time needed to generate the error log is determine, and when the time is over, the solution corresponding to the corresponding generated error log is fed back to the corresponding terminal, and the solution and the corresponding error log are saved to the database of the after sales server.

In the embodiment, a database for repairing the fault of the terminal and a file for repairing the fault of the terminal are established in the after sales server. The solution of the local application corresponding to each terminal fault (error log) is saved in the database. The corresponding solution and the process name of the local application corresponding to each after sales fault (error log) are recorded in the file. The solution includes a new application configured to update the corresponding local application and information about the procedure of repairing the fault. When one terminal feeds back the error log, the after sales server determines whether the solution corresponding to the error log is saved in the database of the after sales server (determines whether an identical fault issue has been previously processed). That is, the solution and the process name corresponding to the error log is first found out from the file for repairing the fault of the terminal, and then the corresponding solution is extracted directly from the database, and the solution is fed back to the corresponding terminal. When the after sales server determines that there is no corresponding solution in the database of the after sales server (that is, an identical fault issue has not been previously processed), the corresponding solution needs to be determined by an operator according to the error log fed back by the terminal. However, because the operator does not necessarily analyze the error log timely to determine the corresponding solution timely, and the it takes some time for the operator to analyze the error log and determine the corresponding solution, when there is no corresponding solution in the database, it is needed that the prompt information is fed back to the terminal to inform the terminal user that nothing can be processed currently. After it is detected that the after sales server generates the solution corresponding to the error log, the solution is fed back to the corresponding terminal timely, and the generated solution and the corresponding error log are saved to the database of the after sales server. As a result, the ready solution is provided for another identical fault issue that appears subsequently in the terminal, which accelerates the speed at which the fault of the terminal the fault of the terminal is repaired, and improves efficiency of repairing the fault of the terminal.

Step S40: Perform, by the terminal, operation of repairing the fault of the terminal according to the solution.

In the embodiment, the specific process of performing, after the terminal receiving the solution, operation of repairing the fault of the terminal according to the solution is as follows: the local application corresponding to the error log is uninstalled, and a new local application fed back by the after sales server is re-installed.

Further, in the foregoing embodiment, the method for repairing a fault of a terminal, after step S10, further includes the following processing: sending, when the application is a third party application, according to a preset receiving port and an IP address of an after sales server of the third party application, the error log to the after sales server.

In the embodiment, the after sales server binds an IP address and a receiving port to the third party application of the terminal in order to receive and save the error log corresponding to the third party application. When the application is determined to be the third party application, the terminal sends the error log to the corresponding after sales server according to the preset receiving port and the IP address of the after sales server.

In the embodiment, the IP address and the receiving port corresponding to the after sales server corresponding to the third party application corresponding to each terminal fault (error log) are saved in the database for repairing the fault of the terminal established in the after sales server. The corresponding solution and the process name of the third party application corresponding to each after sales fault (error log) are recorded in a third party after sales server. That is, in the present disclosure, the after sales server also provides the solution for the faulty third party application of the terminal. The terminal can repair the faulty third party application according to the solution provided by the after sales server, that is, the faulty third party application is uninstalled, and a new third party application fed back by the after sales server is re-installed.

In the method for repairing a terminal failure provided by the foregoing embodiment, a terminal acquires an error log of the terminal according to fault repairing instructions, and extracts identification information of a corresponding application from the error log. When the application is a local application, an IP address of an after sales server corresponding to the local application is determined according to the identification information of the local application and a preset top level domain name corresponding to the after sales server of the local application. The error log is sent to the corresponding after sales server according to a preset receiving port and the IP address of the after sales server. The after sales server determines a solution according to the error log, and feeds back the solution to the terminal. The terminal performs operation of repairing the fault of the terminal according to the solution. In this way, the error log of the terminal can be acquired quickly and accurately. Repairing the fault of the terminal can be rapidly achieved. The occurrence of returning the faulty terminal to the factory for repairing is suppressed completely and effectively. The speed at which the fault of the terminal is repaired is accelerated. Economic cost and time for repairing the fault of the terminal is reduced effectively. Meanwhile, reputation of quality of after sales service of a company is maintained effectively.

Figure 3:
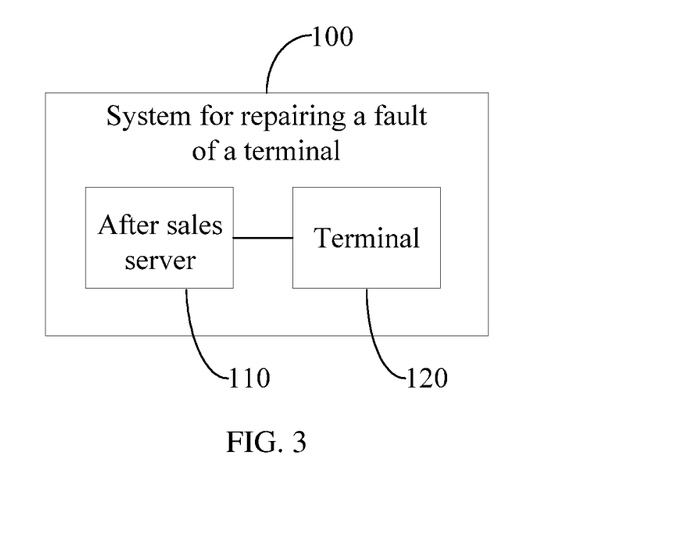
FIG. 3 is a schematic structural diagram of a system for repairing a fault of a terminal according to an embodiment of the present disclosure.

Referring to FIG. 3, the present disclosure further provides a system for repairing a fault of a terminal. FIG. 3 is a schematic structural diagram of the system for repairing a fault of a terminal according to an embodiment of the present disclosure. In the embodiment, the system 100 for repairing a fault of a terminal includes: an after sales server 110 and a terminal 120. The after sales server 110 is configured to receive an error log fed back by the terminal 120 and feed back a corresponding solution to the terminal 120 according to the error log. The terminal 120 is configured to acquire the error log of the terminal according to fault repairing instructions and extract identification information of a corresponding application from the error log; wherein when the application is a local application, an IP address of the after sales server 110 corresponding to the local application is determined according to the identification information of the local application and a preset top level domain name corresponding to the after sales server 110 of the local application; wherein the error log is sent to the corresponding after sales server 110 according to a preset receiving port and the IP address of the after sales server 110; and wherein operation of repairing the fault of the terminal is performed according to the solution fed back by the after sales server 110.

In the embodiment, the terminal 120 is specifically configured to create a log file according to the fault repairing instructions and redirect log information generated by the terminal 120 to the log file, and configure to analyze the log information in the log file to find out the error log, and configure to acquire the process name of the corresponding application from the error log. The operation of redirecting is executed in real time, that is, the terminal 120 is specifically configured to execute the operation of redirecting by using LOGCAT instructions. After a setting time of the error log is generated, the operation of redirecting is stopped. After the operation of redirecting is stopped, the log information is analyzed continuously until the process name of the corresponding application is acquired. That is, after the log file is created, the terminal 120 redirects the log information generated by itself to the foregoing log file in real time, and the log information in the log file is analyzed in real time. When the error log is found out after the analyzing, a timer is started, and after a setting time, the operation of redirecting is stopped. As it costs some time to analyze to find out the error log, while analyzing to find out the error log, not all the error logs are completely redirected to the log file. In the embodiment, after a setting time of the error log is generated, the operation of redirecting is stopped, that is, all the error logs are ensured to be redirected to the foregoing log file, and the complete error logs are ensured to be found out. The foregoing setting time may be setting according to an actual situation, such as 10 seconds. In the step, the specific process of acquiring the process name of the corresponding application from the log information is as follows: The log information is read line by line. When one or more keywords, such as err, error, fail and exception, occur in one line in the log information, the location of the error log in the log information is indicated, and then whether a character string between the first left-paren character "(" and the first slash "/" in this line includes a character "." is determined wherein if so, the log including this line is indicated to be an error log, and a character string before the character "." in the character string between the first left-paren character "(" and the first slash "/" is extracted. The extracted character string is the process name of the application corresponding to the error log.

In the embodiment, the application includes the local application and a third party application. The after sales server 110 includes an after sales server corresponding to the local application and an after sales server corresponding to the third party application, and the after sales server 120 binds a second level domain name and a receiving port to each local application of the terminal. When the application is the local application, the identification information of the local application is the process name of the local application. The process name of the corresponding local application and the preset top level domain name of the terminal 120 are combined to form the second level domain name (i.e. the IP address of the local application). The after sales server 110 binds a corresponding second level domain name to each local application in many ways. For example, in a process in which the IIS application is running, the corresponding second level domain name is bound to each local application. In an alternative way, an automatic match is provided among each local application for choosing (in the automatic match, the process name of the local application is extracted, and the process name and the preset top level domain name of the terminal 120 are combined to form the second level domain name), which implements the binding of the second level domain name. The identification information of the local application is the process name of the local application or another identifier configured to distinguish between applications. The identification information of the local application in the embodiment is the process name of the local application. The terminal 120 is specifically configured to combine the process name of the local application and the preset top level domain name corresponding to the after sales server 110 of the local application to form a second level domain name, and configured to determine the IP address of the after sales server 110 corresponding to the local application according to the second level domain name.

In the embodiment, a list of process names of the local application is saved in the terminal 120. After the terminal 120 finding out the error log and acquiring the process name of the corresponding application, whether the acquired process name exists in the list of process names is determined by the comparison between the process name and the saved list of process names. If the acquired process name exists in the list of process names, the application corresponding to the acquired process name is indicated to be the local application and otherwise the third party application. In addition, the way in which the terminal 120 determines whether the application corresponding to the acquired process name is the local application may also be using code generation. For example, by using the method of getInstalledApplications of PackageManager category in android, all the attributes of Appli-cationInfo and ApplicationInfo.FLAG_SYSTEM are acquired, and an "and" (&) operation is performed on the attributes of ApplicationInfo and ApplicationInfo.FLAG_SYSTEM where the application corresponding to the acquired process name is indicated to be the local application when the operation produces a non-zero result, and otherwise the third party application.

In the embodiment, the after sales server 110 acquires a sending port and an IP address of the terminal from the received error log, and then the after sales server establishes a connection to the terminal by using the sending port and the IP address of the terminal so that the after sales server 110 feeds back the corresponding solution to the terminal 120. That is, after receiving the error log, the after sales server 110 feeds back the corresponding solution to the terminal 120 according to the sending port and the IP address of the terminal.

In the embodiment, the after sales server 110 is specifically configured to determine whether the solution corresponding to the error log is saved in a database of the after sales server; wherein if yes, the solution is fed back to the corresponding terminal 120; and if not, prompt information is fed back to the corresponding terminal 120 to inform a user of the terminal 120 that the solution cannot be fed back currently; and wherein after the solution corresponding to the end user is generated, the solution is timely fed back to the corresponding terminal 120, and the solution and the corresponding error log are saved to the database of the after sales server. That is, a database for repairing the fault of the terminal 120 and a file for repairing the fault of the terminal 120 are established in the after sales server 110. The solution of the local application corresponding to each fault (error log) of the terminal 120 is saved in the database. The corresponding solution and the process name of the local application corresponding to each after sales fault (error log) are recorded in the file. The solution includes a new application configured to update the corresponding local application and information about the procedure of repairing the fault. When one terminal 120 feeds back the error log, the after sales server 110 determines whether the solution corresponding to the error log is saved in the database of the after sales server (determines whether an identical fault issue has been previously processed). That is, the solution and the process name corresponding to the error log is first found out from the file for repairing the fault of the terminal 120, and then the corresponding solution is extracted directly from the database, and the solution is fed back to the corresponding terminal 120. When the after sales server 110 determines that there is no corresponding solution in the database of the after sales server (that is, an identical fault issue has not been previously processed), the corresponding solution needs to be determined by an operator according to the error log fed back by the terminal 120. However, because the operator does not necessarily analyze the error log timely to determine the corresponding solution timely, and the it takes some time for the operator to analyze the error log and determine the corresponding solution, when there is no corresponding solution in the database, it is needed that the prompt information is fed back to the terminal 120 to inform the user of the terminal 120 that nothing can be processed currently. After the solution corresponding to the error log is generated, the solution is fed back to the corresponding terminal 120 timely. When there is no corresponding solution in the database, whether the corresponding solution is generated is detected. After the generated corresponding solution is detected, the generated solution and the corresponding error log are saved to the database of the after sales server. The ready solution is provided for another identical fault issue that appears subsequently in the terminal 120. If the generated corresponding application is not detected, then repeat the detecting. In this way, the speed at which the fault of the terminal 120 is repaired is accelerated, and efficiency of repairing the fault of the terminal 120 is improved.

In the embodiment, the specific process of performing, by the terminal 120, operation of repairing the fault of the terminal according to the solution is as follows: The application corresponding to the error log is uninstalled, and a new application fed back by the after sales server 110 is re-installed.

In the embodiment, the terminal 120 is further configured to send, when the application is a third party application, according to a preset receiving port and an IP address of an after sales server 110 corresponding to the third party application, the error log to the after sales server 110. That is, the after sales server 110 binds an IP address and a receiving port to the third party application of the terminal 120 in order to receive and save the error log corresponding to the third party application. The terminal 120 is configured to send, when the application is determined to be a third party application, according to the preset receiving port and the IP address of the after sales server 110 corresponding to the third party application, the error log to the after sales server 110 (i.e. the after sales server corresponding to the third party application). In addition, the solution corresponding to the third party application corresponding to each fault (error log) of the terminal 120 is saved in the database for repairing the fault of the terminal 120 established in the after sales server 110. The corresponding solution and the process name of the three party application corresponding to each after sales fault (error log) are recorded in the file. That is, in the present disclosure, the after sales server 110 also provides the solution for the faulty third party application of the terminal 120. The terminal 120 can repair the faulty third party application according to the solution provided by the after sales server 110, that is, the faulty third party application is uninstalled, and a new third party application fed back by the after sales server 110 is re-installed.

In the system 100 for repairing a terminal failure provided by the foregoing embodiment, a terminal 120 acquires an error log of the terminal according to fault repairing instructions, and extracts identification information of a corresponding application from the error log. When the application is a local application, an IP address of an after sales server 110 corresponding to the local application is determined according to the identification information of the local application and a preset top level domain name corresponding to the after sales server of the local application. The error log is sent to the corresponding after sales server 110 according to a preset receiving port and the IP address of the after sales server 110. The after sales server 110 determines a solution according to the error log, and feeds back the solution to the terminal 120. The terminal 120 performs operation of repairing the fault of the terminal according to the solution. As such, the error log of the terminal 120 can be acquired quickly and accurately. Repairing the fault of the terminal 120 can be rapidly achieved. The occurrence of returning the faulty terminal 120 to the factory for repairing is suppressed completely and effectively. The speed at which the fault of the terminal 120 is repaired is accelerated. Economic cost and time for repairing the fault of the terminal 120 is reduced effectively. Meanwhile, reputation of quality of after sales service of a company is maintained effectively.

The foregoing is only preferred embodiments of the present disclosure is not patented and therefore limit the scope of the present disclosure, any use of the contents of the present specification and drawings made equivalent or equivalent structural transformation process, either directly or indirectly used in other relevant technology, are included in the patent empathy scope of the disclosure.

What is claimed is:

1. A method for repairing a fault of a terminal, comprising:

acquiring, by the terminal, an error log of the terminal according to fault repairing instructions, and extracting identification information of a corresponding application from the error log, wherein the step of acquiring the error log comprises:

creating a log file according to the fault repairing instructions, redirecting, in real time, log information generated by the terminal to the log file, and analyzing the log information in the log file to find out the error log;

when the error log is found out, a timer is started, and after a setting time, the operation of redirecting is stopped;

when the application is a local application, according to the identification information of the local application and a preset top level domain name corresponding to an after sales server of the local application, determining an IP address of the after sales server corresponding to the local application;

sending the error log to the corresponding after sales server according to a preset receiving port and the IP address of the after sales server, and determining, by the after sales server, a solution according to the error log, and feeding back the solution to the terminal; and performing, by the terminal, operation of repairing the fault of the terminal according to the solution;

after extracting the identification information of the corresponding application from the error log, further comprising:

sending, by the terminal, when the application is a third party application, according to a preset receiving port and an IP address of an after sales server of the third party application, the error log to the after sales server of the third party application.

2. The method for repairing a fault of a terminal according to claim 1, wherein the step of the determining, by the after sales server, a solution according to the error log, and feeding back the solution to the terminal specifically comprises:

acquiring, by the after sales server, a sending port and an IP address of the terminal according to the received error log, so that the after sales server feeds back the corresponding solution to the terminal according to the sending port and the IP address of the terminal.

3. The method for repairing a fault of a terminal according to claim 1, wherein when the identification information of the local application is a process name of the local application, the step of the according to the identification information of the local application and a preset top level domain name corresponding to an after sales server of the local application, determining an IP address of the after sales server corresponding to the local application specifically comprises:

combining the process name of the local application and the preset top level domain name corresponding to the after sales server of the local application to form a second level domain name, and determining the IP address of the after sales server corresponding to the local application according to the second level domain name.

4. The method for repairing a fault of a terminal according to claim 3, wherein the step of the determining, by the after sales server, a solution according to the error log, and feeding back the solution to the terminal specifically comprises:

acquiring, by the after sales server, a sending port and an IP address of the terminal according to the received error log, so that the after sales server feeds back the corresponding solution to the terminal according to the sending port and the IP address of the terminal.

5. The method for repairing a fault of a terminal according to claim 1, wherein the operation of redirecting is implemented by using LOGCAT instructions, and the identification information is a process name of the corresponding application.

6. The method for repairing a fault of a terminal according to claim 5, wherein the step of the determining, by the after sales server, a solution according to the error log, and feeding back the solution to the terminal specifically comprises:

acquiring, by the after sales server, a sending port and an IP address of the terminal according to the received error log, so that the after sales server feeds back the corresponding solution to the terminal according to the sending port and the IP address of the terminal.

7. The method for repairing a fault of a terminal according to claim 1, wherein the step of the determining, by the after sales server, a solution according to the error log, and feeding back the solution to the terminal specifically comprises:

acquiring, by the after sales server, a sending port and an IP address of the terminal according to the received error log, so that the after sales server feeds back the corresponding solution to the terminal according to the sending port and the IP address of the terminal.

8. The method for repairing a fault of a terminal according to claim 1, wherein the determining, by the after sales server, a solution according to the error log, and feeding back the solution to the terminal specifically comprises:

determining, by the after sales server, whether the solution corresponding to the error log is saved in a database of the after sales server;

if yes, feeding back the solution to the corresponding terminal;

if not, feeding back prompt information to the corresponding terminal to inform a terminal user that the solution cannot be fed back currently; and detecting whether the solution corresponding to the error log is generated, if yes, timely feeding back the solution to the corresponding terminal, and saving the solution and the corresponding error log to the database of the after sales server.

9. The method for repairing a fault of a terminal according to claim 8, wherein the step of the determining, by the after sales server, a solution according to the error log, and feeding back the solution to the terminal specifically comprises:

acquiring, by the after sales server, a sending port and an IP address of the terminal according to the received error log, so that the after sales server feeds back the corresponding solution to the terminal according to the sending port and the IP address of the terminal.

10. The method for repairing a fault of a terminal according to claim 1, wherein the terminal determines whether the application is the local application by using a method of getInstal-ledApplications of PackageManager in android system, all attributes of ApplicationInfo and ApplicationInfo.FLAG_SYSTE-M are acquired, and an "and" (&) operation is performed on the attributes of ApplicationInfo and ApplicationInfo.FLAG_SYSTEM where the application is the local application when the "and" (&) operation produces a non-zero result, and otherwise the application is the third party application.

11. A system for repairing a fault of a terminal, comprising:

at least an after sales server, configured to receive an error log fed back by a terminal and feed back a corresponding solution to the terminal according to the error log; and the terminal, configured to acquire the error log of the terminal according to fault repairing instructions and extract identification information of a corresponding application from the error log; wherein when the application is a local application, an IP address of the after sales server corresponding to the local application is determined according to the identification information of the local application and a preset top level domain name corresponding to the after sales server of the local application; wherein the error log is sent to the corresponding after sales server according to a preset receiving port and the IP address of the after sales server; and wherein operation of repairing the fault of the terminal is performed according to the solution fed back by the after sales server, wherein the terminal is further configured to create a log file according to the fault repairing instructions, redirect, in real time, log information generated by the terminal to the log file, and analyze the log information in the log file to find out the error log;

when the error log is found out, start a timer, and after a setting time, stop the operation of redirecting; and send, when the application is a third party application, according to a preset receiving port and an IP address of an after sales server of the third party application, the error log to the after sales server of the third party application.

12. The system for repairing a fault of a terminal according to claim 11, wherein the after sales server is further configured to acquire a sending port and an IP address of the terminal according to the received error log, so that the after sales server feeds back the corresponding solution to the terminal according to the sending port and the IP address of the terminal.

13. The system for repairing a fault of a terminal according to claim 11, wherein when the identification information of the local application is a process name of the local application, the terminal is further configured to combine the process name of the local application and the preset top level domain name corresponding to the after sales server of the local application to form a second level domain name, and configured to determine the IP address of the after sales server corresponding to the local application according to the second level domain name.

14. The system for repairing a fault of a terminal according to claim 13, wherein the after sales server is further configured to acquire a sending port and an IP address of the terminal according to the received error log, so that the after sales server feeds back the corresponding solution to the terminal according to the sending port and the IP address of the terminal.

15. The system for repairing a fault of a terminal according to claim 11, wherein the operation of redirecting is implemented by using LOGCAT instructions, and the identification information is a process name of the corresponding application.

16. The system for repairing a fault of a terminal according to claim 15, wherein the after sales server is further configured to acquire a sending port and an IP address of the terminal according to the received error log, so that the after sales server feeds back the corresponding solution to the terminal according to the sending port and the IP address of the terminal.

17. The system for repairing a fault of a terminal according to claim 11, wherein the after sales server is further configured to acquire a sending port and an IP address of the terminal according to the received error log, so that the after sales server feeds back the corresponding solution to the terminal according to the sending port and the IP address of the terminal.

18. The system for repairing a fault of a terminal according to claim 11, wherein
the after sales server is specifically configured to determine whether the solution corresponding to the error log is saved in a database of the after sales server; wherein if yes, the solution is fed back to the corresponding terminal; and if not, prompt information is fed back to the corresponding terminal to inform a terminal user that the solution cannot be fed back currently; and wherein after the solution corresponding to the error log is generated, the solution is timely fed back to the corresponding terminal, and the solution and the corresponding error log are saved to the database of the after sales server.

19. The system for repairing a fault of a terminal according to claim 18, wherein the after sales server is further configured to acquire a sending port and an IP address of the terminal according to the received error log, so that the after sales server feeds back the corresponding solution to the terminal according to the sending port and the IP address of the terminal.

20. The system for repairing a fault of a terminal according to claim 11, wherein the terminal determines whether the application is the local application by using a method of getInstal-ledApplications of PackageManager in android system, all attributes of ApplicationInfo and ApplicationInfo.FLAG_SYSTE-M are acquired, and an "and" (&) operation is performed on the attributes of ApplicationInfo and ApplicationInfo.FLAG_SYSTEM where the application is the local application when the "and" (&) operation produces a non-zero result, and otherwise the application is the third party application.

* * * * *